US006981877B2

(12) United States Patent
Ren et al.

(10) Patent No.: US 6,981,877 B2
(45) Date of Patent: *Jan. 3, 2006

(54) SIMPLIFIED DIRECT OXIDATION FUEL CELL SYSTEM

(75) Inventors: Xiaoming Ren, Guilderland, NY (US); Juan J. Becerra, Altamont, NY (US); Gerhard Beckmann, Altamont, NY (US); Eric J. Brown, Voorheesville, NY (US); Michael S. DeFilippis, Niskayuna, NY (US); Jay K. Neutzler, Palm Beach Gardens, FL (US); Shimshon Gottesfeld, Niskayuna, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/078,601

(22) Filed: Feb. 19, 2002

(65) Prior Publication Data

US 2003/0157395 A1 Aug. 21, 2003

(51) Int. Cl.
*H01M 2/00* (2006.01)
*B01D 27/00* (2006.01)

(52) U.S. Cl. ............................ 439/34; 429/38; 429/30; 210/435

(58) Field of Classification Search ................. 429/34, 429/38, 39, 30, 42, 44, 12, 25; 427/115; 210/435, 500.1, 510.1
See application file for complete search history.

(56) References Cited

U.S. PATENT DOCUMENTS

| 4,046,956 | A |   | 9/1977  | Fanciullo           |
|-----------|---|---|---------|---------------------|
| 4,132,695 | A |   | 1/1979  | Burkholder          |
| 4,478,917 | A |   | 10/1984 | Fujita et al.       |
| 4,537,840 | A |   | 8/1985  | Tsukui et al.       |
| 4,562,123 | A |   | 12/1985 | Shimizu et al.      |
| 4,593,534 | A |   | 6/1986  | Bloomfield          |
| 4,673,624 | A |   | 6/1987  | Hockaday            |
| 4,810,597 | A |   | 3/1989  | Kumagai et al.      |
| 4,828,941 | A |   | 5/1989  | Sterzel             |
| 4,931,168 | A | * | 6/1990  | Watanabe et al. ........... 204/284 |
| 5,460,896 | A |   | 10/1995 | Takada et al.       |
| 5,523,177 | A |   | 6/1996  | Kosek et al.        |
| 5,573,866 | A |   | 11/1996 | Van Dine et al.     |
| 5,599,638 | A |   | 2/1997  | Surampudi et al.    |
| 5,629,104 | A |   | 5/1997  | Crawford, Sr. et al.|
| 5,631,099 | A |   | 5/1997  | Hockaday            |
| 5,686,200 | A |   | 11/1997 | Barton et al.       |
| 5,723,228 | A |   | 3/1998  | Okamoto             |
| 5,759,712 | A |   | 6/1998  | Hockaday            |
| 5,766,786 | A |   | 6/1998  | Fleck et al.        |
| 5,773,162 | A |   | 6/1998  | Surampudi et al.    |
| 5,795,668 | A |   | 8/1998  | Banerjee            |
| 5,916,699 | A |   | 6/1999  | Thomas et al.       |
| 5,925,476 | A |   | 7/1999  | Kawatsu             |
| 5,945,231 | A |   | 8/1999  | Narayanan et al.    |
| 5,992,008 | A |   | 11/1999 | Kindler             |
| 6,130,175 | A |   | 10/2000 | Rusch et al.        |
| 6,232,010 | B1 |   | 5/2001  | Cisar et al.       |
| 6,248,469 | B1 |   | 6/2001  | Formato et al.     |
| 6,265,093 | B1 |   | 7/2001  | Surampudi et al.   |
| 6,296,964 | B1 |   | 10/2001 | Ren et al.         |
| 6,303,244 | B1 |   | 10/2001 | Surampudi et al.   |
| 6,322,917 | B1 |   | 11/2001 | Acker              |
| 6,350,540 | B1 |   | 2/2002  | Sugita et al.      |
| 6,387,559 | B1 |   | 5/2002  | Koripella et al.   |
| 6,410,180 | B1 |   | 6/2002  | Cisar et al.       |
| 6,420,059 | B1 |   | 7/2002  | Surampudi et al.   |
| 6,447,943 | B1 |   | 9/2002  | Peled et al.       |
| 6,458,479 | B1 |   | 10/2002 | Ren et al.         |
| 6,465,119 | B1 |   | 10/2002 | Koripella et al.   |
| 6,492,047 | B1 |   | 12/2002 | Peled et al.       |
| 6,497,975 | B2 |   | 12/2002 | Bostaph et al.     |
| 6,506,513 | B1 |   | 1/2003  | Yonetsu et al.     |
| 6,509,112 | B1 |   | 1/2003  | Luft et al.        |
| 6,808,838 | B1 |   | 10/2004 | Wilson             |
| 2001/0051293 | A1 |   | 12/2001 | Narayanan et al. |
| 2002/0172851 | A1 | * | 11/2002 | Corey et al. ................... 429/34 |
| 2004/0265680 | A1 | * | 12/2004 | Ren et al. ..................... 429/44 |

FOREIGN PATENT DOCUMENTS

EP 0 907 979 B1 3/2000

OTHER PUBLICATIONS

"Fuel Cell", 1992 Fuel Cell Seminar, Program and Abstracts, pp. 233-236, 461-464, no date available.
"Miniaturized Fuel Cells for Portable Power", Helen L. Maynard and Jeremy P. Meyers, Lucent Technologies, 2000, no date available.
"Pocket-size PEMs", Paul Sharke, Mechanical Engineering, no date available.
"Polymer Electrolyte Fuel Cells as Potential Power Sources for Portable Electronic Devices", Shinshon Gottesfeld and Mahlon S. Wilson, pp. 486-517, no date available.

(Continued)

*Primary Examiner*—Raymond Alejandro
(74) *Attorney, Agent, or Firm*—Cesari and McKenna LLP (57) ABSTRACT

A simplified direct oxidation fuel cell system is provided. The fuel cell is constructed in such a manner that fuel is added to the cell anode as it is consumed and water is evaporated off at cell cathode so that there is no need for recirculation of unreacted fuel at the cell anode or water at the cell cathode. In addition, carbon dioxide generated from the anodic reaction is passively vented out of the system by using a CO2 gas permeable membrane material integrated as part of the anode chamber construction. Other embodiments of the invention include a fuel container and delivery assembly.

30 Claims, 9 Drawing Sheets

OTHER PUBLICATIONS

Ren, Xiaoming et al. Methanol Cross-Over in Direct Methanol Fuel Cells, Electronic and Electrochemical Materials and Devices, MST-11, MS-D429, Los Alamos National Laboratory, NM, all pages, no date available.

International Search Report for International Applicatin No.: PCT/US03/04766, International Filing Date: Feb. 18, 2003, all pages.

Lubovskiy, V.V. et al., System for Monitoring and Regulating Fuel Concentration in an Anolyte, USSR Author's Certificate, SU 1,610,522 A1, International Classification 5 H 01 M Aug. 2004, Application Date: Sep. 15, 1988, Published: Nov. 30, 1990, all pages.

A. Blum et al., "Water Neutral Micro Direct-Methanol Fuel Cell (DMFC) for Portable Applications," The Journal of Power Sources, vol. 117 (May 15, 2003), pp. 22-25.

* cited by examiner

SIMPLIFIED DIRECT OXIDATION FUEL CELL SYSTEM

BACKGROUND OF THE INVENTION

1. Field of the Invention

The present invention relates generally to the field of fuel cells, and more specifically, to a simplified direct oxidation fuel cell device containing a direct oxidation fuel cell stack with a fuel container, fuel delivery and reaction product release system.

2. Background Information

Fuel cells are devices in which electrochemical reactions are used to generate electricity. A variety of materials may be suited for use as a fuel depending upon the materials chosen for the components of the cell. Organic materials, such as methanol or natural gas, are attractive choices for fuel due to their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and requires significant volume, reformer based systems are presently limited to comparatively high power applications.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive but electronically non-conductive membrane (PCM). Typically, a catalyst which enables direct oxidation of the fuel on the anode is disposed on the surface of the PCM (or is otherwise present in the anode chamber of the fuel cell). Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol in an aqueous solution is used as fuel (the "fuel mixture"), and oxygen, preferably from ambient air, is used as the oxidizing agent. There are two fundamental reactions that occur in a DMFC which allow a DMFC system to provide electricity to power consuming devices: the anodic disassociation of the methanol and water fuel mixture into CO2, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa). A common problem with DMFCs, is that some methanol may pass through the membrane, from the anode portion of the fuel cell to the cathode chamber of the fuel cell without reacting. This phenomenon, known as methanol crossover, may be limited by introducing a dilute aqueous methanol solution as fuel, rather than a concentrated solution.

Fuel cells and fuel cell systems have been the subject of intensified recent development because of their ability to efficiently convert the energy in carbonaceous fuels into electric power while emitting comparatively low levels of environmentally harmful substances. The adaptation of fuel cell systems to mobile uses, however, is not straight-forward because of the technical difficulties associated with reforming the complex carbonaceous fuels in a simple, cost effective manner, and within acceptable form factors and volume limits. Further, a safe and efficient storage means for substantially pure hydrogen (which is a gas under the relevant operating conditions) presents a challenge because hydrogen gas must be stored at high pressure and at cryogenic temperatures or in heavy absorption matrices in order to achieve useful energy densities. It has been found, however, that a compact means for storing hydrogen is in a hydrogen rich compound with relatively weak chemical bonds, such as methanol or an aqueous methanol solution (and to a lesser extent, ethanol, propane, butane and other carbonaceous liquids or aqueous solutions thereof).

In particular DMFCs are being developed for commercial production for use in portable electronic devices. Thus, the DMFC system, including the fuel cell, and the components may be fabricated using materials that not only optimize the electricity-generating reactions, but which are also cost effective. Furthermore, the manufacturing process associated with those materials should not be prohibitive in terms of labor intensity cost.

A typical MEA includes a centrally disposed protonically conductive, electronically non-conductive membrane ("PCM"). One example of a commercially available PCM is NAFION® (a registered trademark of E.I. Dupont de Nemours and Company), a cation exchange membrane comprised of perflorocarbon polymers with side chain termini of perflourosulfonic acid groups, in a variety of thicknesses and equivalent weight. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer functions to evenly distribute the liquid fuel mixture across the anode in the case of the fuel, or the gaseous oxygen from air or other source across the cathode face of the PCM. In addition, flow field plates are often placed on the surface of the diffusion layers that are not in contact with the coated PCM. The flow field plates function to provide mass transport of the reactants and by products of the electrochemical reactions, and they also have a current collection functionality in that the flow field plates act to collect and conduct electrons to the external wires connecting to the load.

Direct methanol fuel cell systems typically employ an active management scheme to manage the reactants and byproducts in the direct methanol fuel cell including pumping or otherwise causing fuel mixtures, byproducts and reactants to be circulated throughout the fuel cell system. However, actively managing these reactants and byproducts can involve the use of pumps and flow channels or conduits. In a small hand-held device, in which DMFCs have great potential application, parasitic power losses and volume consumed due to pumps and other devices can be relatively large when compared to the overall power output and volume of a small unit. Thus, it is desirable to avoid using extra pumps, valves and components that consume power or occupy volume within the system. Moreover, such additional components can result in a greater manufacturing and production expense, particularly when those products are going to be manufactured in commercial quantities. In addition, the additional complexity involved in active management of the gases and fluids within the system create a bulky system which can present difficulties with conforming with requisite form factors and space constraints associated with small hand-held devices.

It is thus critical to minimize the complexity and volume of such systems and it is also important to reduce the cost and complexity of manufacturing in large-scale production.

In addition to systemic considerations, it is important to maximize the efficiency of the fuel cell by minimizing certain phenomena associated with DMFCs, as known to those skilled in the art. One goal is to minimize undesirable methanol crossover, which occurs where more methanol than necessary is delivered to the anode side of the fuel cell, and passes through to the cathode without producing electricity, thus wasting fuel and generating unnecessary heat. In addition, it is also desirable to avoid a buildup of cathodically generated water on the cathode diffusion layer, in order to prevent flooding of the cathode catalyst, thus halting the cathodic half reaction, resulting in performance losses.

There remains a need for a direct oxidation fuel cell system, which includes the ability to adjust the amount of methanol, which is presented to the anode in order to avoid excessive amounts of unreacted fuel in the cell. In addition, there remains a need for simplified cell geometry and simple mechanisms for flow adjustment to achieve system simplicity and reliability and facilitate large-scale production of such systems for mass manufacturing.

It is thus an object of the present invention to minimize the loss of methanol and water via crossover and carryover by controlling the introduction of those fluids into the system in the first place, and to present a very simple fuel delivery system which increases net power provided to the load due to the minimization of parasitic losses that are suffered in more complex systems with more active flow of liquid(s). This type of passive direct methanol fuel cell system operation is also facilitated by the separation of gaseous carbon dioxide within the fuel cell, thus eliminating the requirement for at least one pump within the DMFC system.

SUMMARY OF THE INVENTION

These and other advantages are provided by the present invention in which a simplified direct oxidation fuel cell system is provided. In one embodiment of the invention, the fuel cell includes a membrane electrode assembly which has a gas permeable layer disposed generally parallel to the anode face of the membrane electrode assembly. The gas permeable layer includes a gas-permeable material, disposed generally parallel to, and in close proximity to, an anode diffusion layer, and it removes the CO2 gas generated in the anoxic reaction, and separates it away from the anode compartment. The CO2 is thus simply vented out of the system, preventing accumulation, which may hinder the anode reaction.

In addition, a fuel delivery assembly coupled with an associated fuel source has a pressure-applying member that places the fuel mixture under pressure and thus delivers fuel to the anode. Thus, as the electricity generating reactions occur, the combination of the CO2 separation and the fuel being consumed creates a void in the anode compartment. The void created is immediately filled with fresh fuel from the pressurized fuel cell delivery system. In this manner, only the amount of fuel that has been consumed is added, thereby avoiding the need to recirculate unreacted fuel back into the fuel cell system. This also minimizes or eliminates the needs for pumps and valves, and other recirculation devices In accordance with another aspect of this embodiment of the invention, there is essentially no recovery of liquid water from the cathode face of the fuel cell, and no recirculation of water. This further simplifies the DMFC system. The anode fluid recirculation is required, as revealed in previous patents for an active DMFC system design including, but not limited to those described in U.S. Pat. Nos. 5,599,638; 5,992,008; and 5,945,231, in order to vent the CO2 and control the methanol concentration in such an active system design.

In accordance with yet a further aspect of the invention, a fuel cell system is described which includes a fuel delivery assembly in which different components deliver fuel and water from discrete sources into the fuel cell. Pure methanol or a concentrated methanol solution is held in one chamber, and water, or a more dilute methanol solution is held in another chamber. The chambers are preferably flexible bladders under pressure, but may, under certain circumstances, be rigid-walled containers. A first inner container disposed within an outer housing holds the fuel solution, and a fuel conduit leads from that first inner container to the fuel cell. A second inner container, which is also disposed within the outer housing holds water to be mixed with the fuel. A water conduit leads from the second container to the fuel cell. A mixing assembly includes a connection that routes the fuel conduit into the water conduit, thus causing the water and methanol to mix. Alternatively, the mixing assembly routes the water conduit into the fuel conduit, thus causing the water and fuel to mix. Alternatively, a mixing chamber can be included into which the fuel conduit and water conduit lead; and once mixed, the substances are distributed in the desired concentration to the fuel cell, typically to the diffusion layer of the anode of the fuel cell.

In accordance with another aspect of this embodiment of the invention, fuel solution and water are delivered to the fuel cell by separate flow channels, and the mixing process occurs directly upon the anode diffusion layer, prior to being introduced to the anode catalyst on the protonically conductive membrane.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
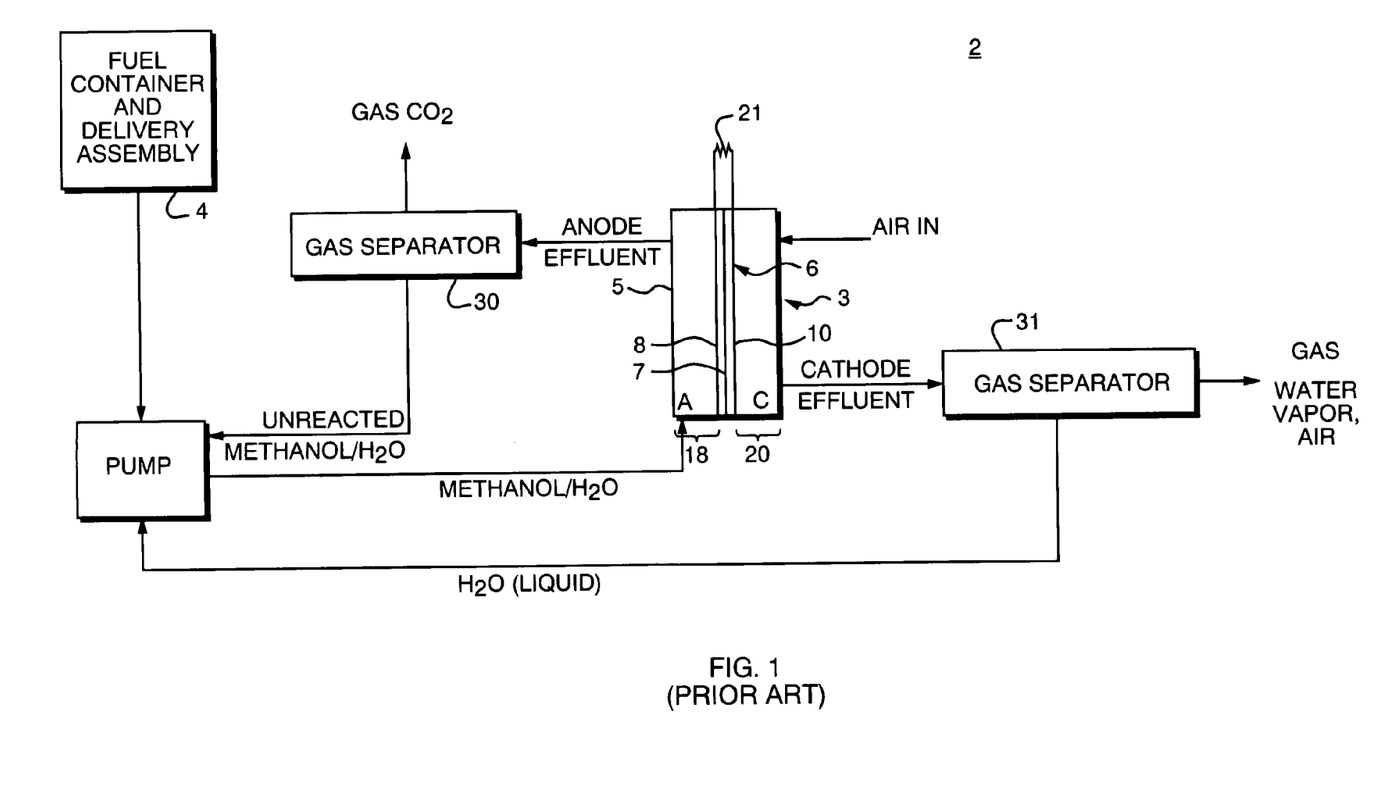
FIG. 1 is a block diagram of a prior art direct oxidation fuel cell system.

For a better understanding of the invention, the components of a direct oxidation fuel cell system, a direct oxidation fuel cell and the basic operation of a typical direct oxidation fuel cell system, as is understood in the prior art, will be briefly described. A prior art direct oxidation fuel cell system 2 is illustrated in FIG. 1. The fuel cell system 2 includes a direct oxidation fuel cell, which may be a direct methanol fuel cell 3 ("DMFC"), for example. For purposes of illustration we herein describe an illustrative embodiment of the invention with DMFC 3, with the fuel substance being methanol or an aqueous methanol solution. It should be understood, however, that it is within the scope of the present invention that other fuels may be used in an appropriate fuel cell. Thus, as used herein, the word "fuel" shall include methanol, ethanol, propane, butane or combinations thereof and aqueous solutions thereof, and other hydrocarbon fuels amenable to use in direct oxidation fuel cell systems.

The system 2, including the DMFC 3, has a fuel delivery system 4 to deliver fuel from an associated fuel source. The DMFC 3 includes a housing 5 that encloses a membrane electrode assembly 6 (MEA). MEA 6 incorporates protonically conductive, electronically non-conductive membrane 7. PCM 7 has an anode face 8 and cathode face 10, each of which may be coated with a catalyst, including but not limited to platinum or a blend of platinum and ruthenium or a platinum/ruthenium alloy. The catalyst may be supported or unsupported, or dispersed within a recast ionomer blend. The portion of DMFC 3 defined by the housing 5 and the anode face of the PCM is referred to herein as the anode chamber 18. The portion of DMFC 3 defined by the housing and the cathode face of the PCM is referred to herein as the cathode chamber 20. Additional elements of the direct methanol fuel cell system such as flow field plates, and diffusion layers (not shown in FIG. 1) may be employed to facilitate flow of reactants and byproducts and may also be included within anode chamber 18 and cathode chamber 20. Cathode effluent may be released to a gas separator 31, if desired in a particular application of the invention.

Figure 2:
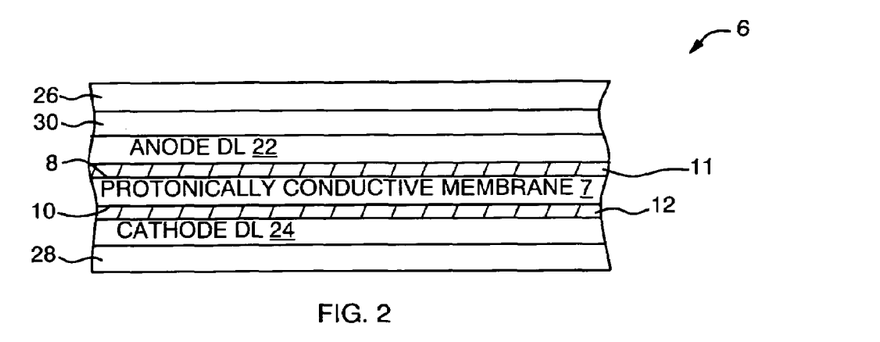
FIG. 2 is a schematic cross section of one embodiment of the membrane electrode assembly (MEA) of the present invention, which includes an anode gas permeable layer in intimate contact with the anode diffusion layer.

Referring now to FIG. 2, a membrane electrode assembly 6 has the centrally disposed, protonically-conductive membrane (PCM) 7. PCM 7 is impermeable to electrons and thus the electrons travel through the load providing electrical power. The PCM 7 is composed of a suitable material, such as poly perfluorovinylether sulfonic acid (which is commercially available as NAFION® a registered trademark of E.I. Dupont de Nemours and Company). A catalyst 11, typically platinum or an alloy of platinum and ruthenium, is disposed between the anode diffusion layer 22 and PCM 7. A cathode catalyst 12, typically platinum, is also disposed between the cathode diffusion layer 24 and the PCM 7. The anode diffusion layer 22 would, in turn be in contact with an anode flow field plate 26. In some embodiments of the invention the flow field plate 26 and diffusion layer 22 may consist of one component. A cathode diffusion layer 24 is in contact with cathode flow field plate 28. These components of the fuel cell are in well-defined contact with one another to promote electrical conductivity, and minimize contact losses. As will be understood by those skilled in the art, the MEA need not be a six layer device, but can contain fewer components when the functionality of several components are combined.

Furthermore, as will be understood by those skilled in the art, electricity-generating reactions occur when a fuel substance is introduced to the anode face 8 of the PCM 7, and oxygen, usually supplied through the introduction of ambient air, is introduced to the cathode face 10 of the PCM 7. More specifically, a carbonaceous fuel substance is delivered to the anode chamber 18 of the DMFC 3. The fuel mixture passes through channels in a flow field plate and/or a diffusion layer that is discussed in further detail herein, and is ultimately presented to the catalysts. Catalysts on the membrane surface, or which are otherwise present near the membrane surface, enable the direct oxidation of the carbonaceous fuel on the anode face of the PCM. This generates $CO_2$, protons and electrons from the fuel and water molecules of the fuel mixture. Upon the closing of an external circuit, these protons pass through PCM 7, which is impermeable to electrons. The electrons reunite with the protons and oxygen in the cathodic electrochemical reaction after traveling through a load 21 of the external circuit, thus providing the electrical power to the load. As long as the chemical reactions continue, a current is maintained through the external circuit.

In accordance with the present invention, a passive DMFC system is provided in which the fuel is delivered to the MEA 6 in such a manner that the fuel delivered is effectively consumed so that there is no need to recirculate unreacted fuel from the anode. This is possible based on several aspects of the present invention. As will be understood by those skilled in the art, direct methanol fuel cells produce liquid water ($H_2O$) at the cathode and gaseous carbon dioxide ($CO_2$) at the anode as chemical products of the reaction. Prior systems, such as those set forth in FIG. 1, and in U.S. Pat. No. 5,599,638, separate carbon dioxide produced in the anodic reaction out of the system to ambient air, by circulating any unreacted fuel mixture and the carbon dioxide carried within it through gas separators located outside the fuel cell anode chamber, or allowing the carbon dioxide to be vented passively directly to the ambient enviroment at a vent located outside the fuel cell anode chamber, based on the tendency of gasses in a liquid solution to rise. Alternatively, the carbon dioxide may be used to perform work within the system. Such systems have been described in commonly-owned U.S. Pat. No. 6,645,655, which issued on Nov. 11, 2003 for a PASSIVELY PUMPED LIQUID FEED FUEL CELL SYSTEM, which is incorporated by reference herein in its entirety.

Another method of utilizing the carbon dioxide is described in U.S. Pat. No. 6,566,033, which issued on May 20, 2003 for a METHOD AND APPARATUS FOR CO2-DRIVEN MANAGEMENT FOR A DIRECT OXIDATION FUEL CELL SYSTEM, which discloses a method of using carbon dioxide to actively draw air to the cathode face of the protonically-conductive membrane.

Figure 1A:
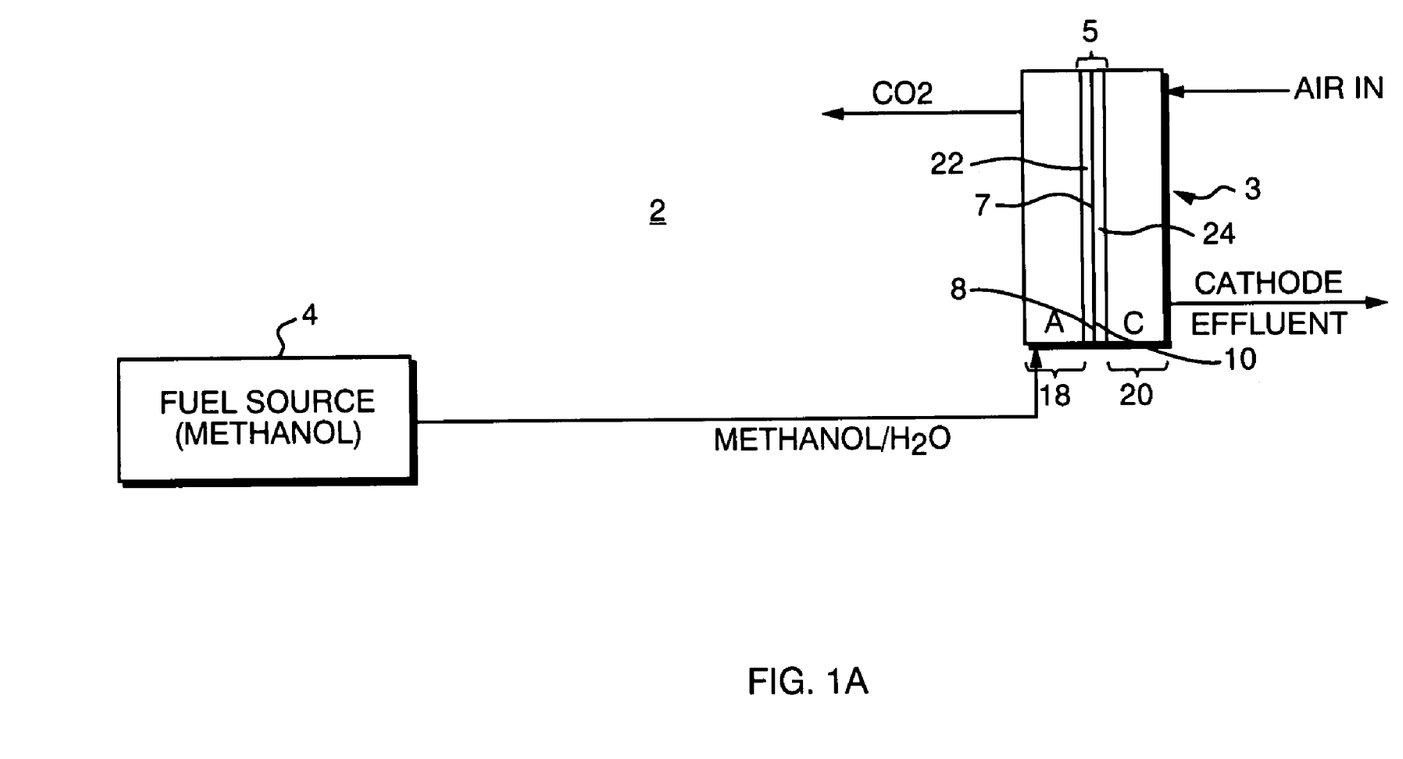
FIG. 1A is a block diagram of a direct methanol fuel cell system in which the present invention may be employed.

However, a direct methanol fuel cell may be simplified, in accordance with the present invention, by being constructed without the use of pumps if, in the first instance, the carbon dioxide is vented out of the system without having to circulate the fuel solution in which the carbon dioxide is contained. A schematic diagram of the invention, which implements a carbon dioxide separator enabling such passive selective venting of $CO_2$ is set forth in FIG. 1A.

The carbon dioxide is vented out of the system by a gas-permeable layer 30. In FIG. 2, a gas permeable, liquid impermeable layer is mechanically fastened or bonded to the opposite side of the anode diffusion layer. This forms a 6-layer MEA including a gas separator/anode diffusion layer/anode catalyst/PCM/cathode catalyst/cathode diffusion layer. The removal of the anodically-generated gases ($CO_2$) from the anode side of the MEA is accomplished by the gas permeable layer 30, preferably composed of a porous or expanded PTFE that is placed in close proximity to the side of the anode diffusion layer is opposite to a front surface, which is in intimate contact with the anode surface 8 of the direct methanol fuel cell membrane 7. The resulting system self-regulates delivery of fuel to the anode by only allowing fuel to enter at the rate it is consumed, because the passive effective removal of $CO_2$ ensures that the only change in volume in the anode compartment is caused by the anodic, fuel consuming process.

Fuel is delivered to the cell at a slight pressure to ensure that sufficient fuel is always introduced to the system to completely fill the volume created by the consumption of fuel and release of carbon dioxide product. The gas generated in the anode compartment is driven through the gas permeable layer 30 by the differential partial pressure of $CO_2$ across the separator membrane. Consumption of fuel in the anode compartment will create a void if the product gas is effectively vented and this void is instantaneously filled by additional fuel from the pressurized fuel source. There is substantially no fuel exit from the anode compartment, so fuel can only enter the anode compartment 18 at the rate it is consumed, and/or lost by methanol crossover. Methanol crossover is minimized, however, according to this scheme for a passive DMFC system, by limiting and controlling the concentration of methanol in the anode compartment through addition of fuel at the same rate of it's consumption.

Figure 3:
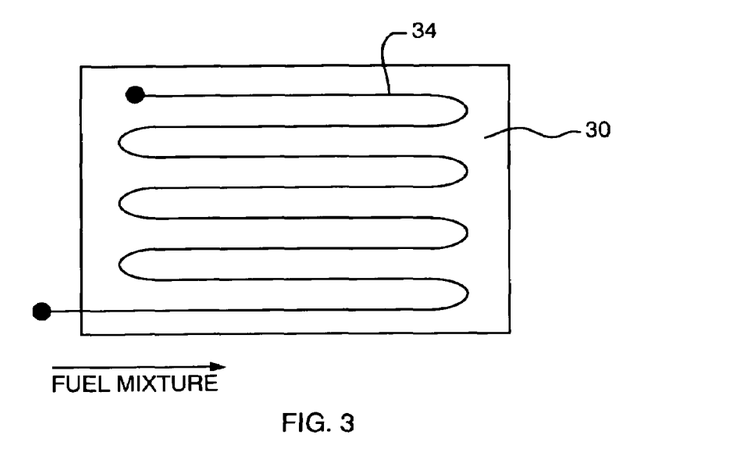
FIG. 3 is a top plan view of the gas separation layer of the present invention, with fuel flow path systems incorporated therein.

FIG. 3 is a top plan view of the gas permeable layer 30, into which a flow field channel 34 has been fashioned. The fuel mixture is added to the anode chamber and passes along the circuitous path of the flow field 34 along the gas permeable membrane, introducing fuel to the anode diffusion layer.

Figure 5:
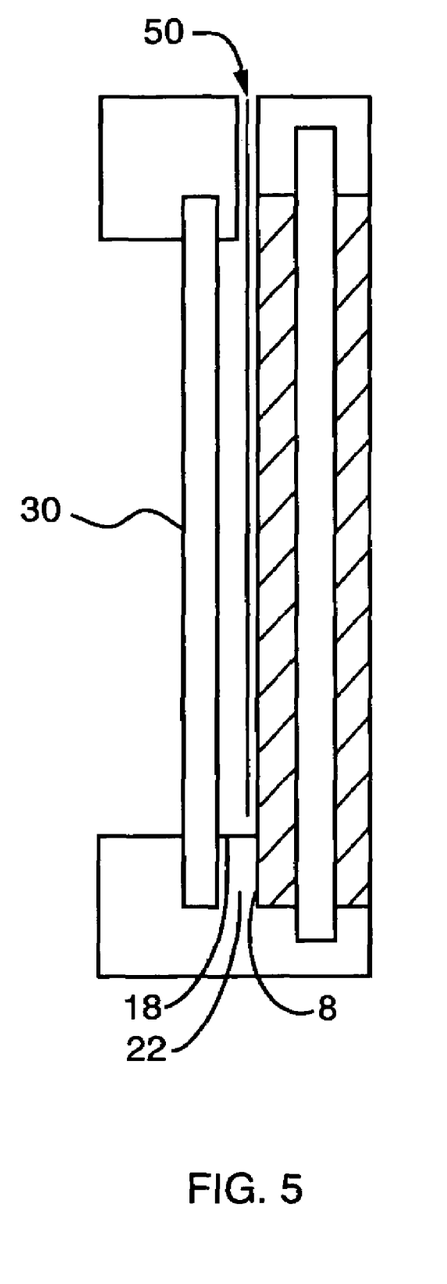
FIG. 5 is a schematic cross section of a further embodiment of the invention in which a gas permeable, fluid impermeable membrane is placed in close proximity to the anode surface to allow carbon dioxide gas to be vented out of the system.
Figure 6:
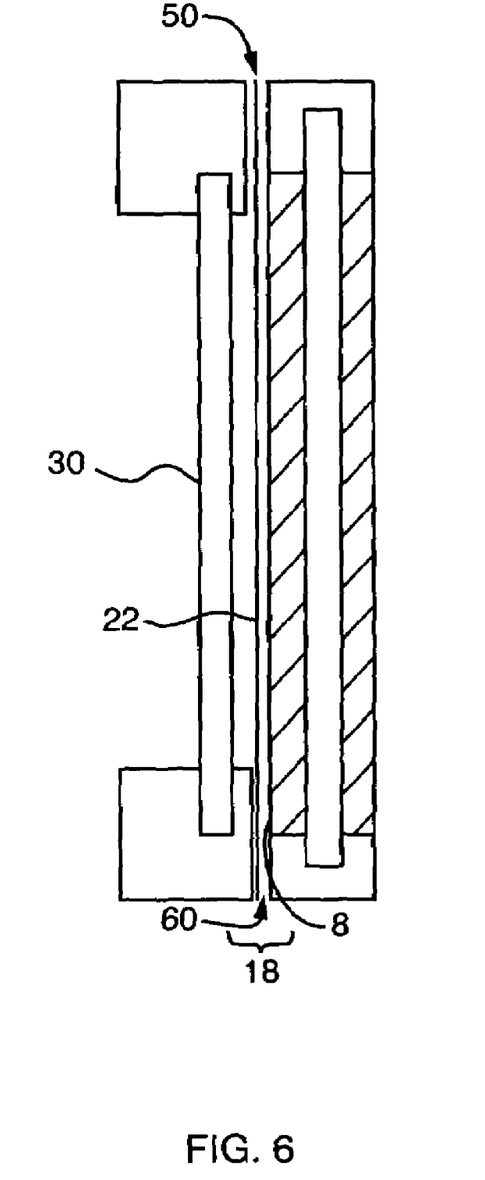
FIG. 6 is an alternative embodiment of the device of FIG. 5 in which a second fuel inlet is added to the system to allow for high concentration methanol to be delivered to a first inlet and low concentration to be delivered to a second inlet.

As illustrated in FIGS. 5 and 6, the gas permeable layer 30 is placed in close proximity to the diffusion layer 22, which is in intimate contact with the anode surface 8. A fuel inlet 50 allows for the introduction of the fuel between the gas permeable layer 30 and the anode surface 8 of the MEA 6. Flow fields in the gas permeable layer 30 direct the fuel along a serpentine path to distribute the fuel across the anode diffusion layer in a substantially uniform manner.

Figure 4:
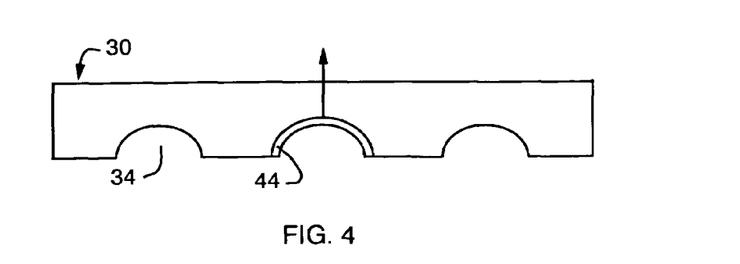
FIG. 4 is a schematic side section of the gas separation layer embodiment of the present invention, which allows carbon dioxide to be separated while being impermeable to the fuel solution.

As $CO_2$ is generated in the reactions, it is drawn through the gas permeable layer 30 and away from the membrane electrode assembly. The gas permeable layer 30 is permeable to gas but impermeable to liquid such as methanol and water, and may be fashioned from other hydrophobic materials to substantially resist the liquids in the fuel solution from passing through the gas permeable layer. It may be possible to fashion the fuel conduit by hot pressing or milling the flow field into the $CO_2$ separation layer, which is preferably fabricated from an expanded PTFE or other gas permeable material. It is sealed against leakage (as illustrated schematically by the darker portion 44) such that only gas will travel in the direction of the arrow out of the system and fuel would travel in a direction perpendicular to the figure (z-axis). Alternatively, portions of the gas permeable layer 30 in may be treated in such a fashion that only certain areas will allow carbon dioxide to pass, causing it to be removed at these areas of the gas permeable layer 30. It should thus be understood that removal of anodically generated gasses by the membrane 30, from the anode chamber 18 of the fuel cell is performed without having to move the fuel through a separate conduit or into a separate chamber. It is further possible to attach the gas permeable layer 30 to the MEA 6 mechanically or by bonding it to the is diffusion later, forming a 6-layer MEA as shown in FIG. 2.

Alternatively, the gas permeable membrane may be in physical contact with the anode diffusion layer next to the face of the PCM 7. In either case, the gas permeable membrane is in sufficiently close proximity that the $CO_2$ that passes through the anode diffusion layer can escape before the $CO_2$ molecules are able to coalesce and form large bubbles, which could disrupt the flow of fluids in and around the fuel cell. The gas permeable membrane draws the carbon dioxide gas generated in the anodic reaction away from the anode surface. Those skilled in the art will recognize that a gas permeable layer will not only allow carbon dioxide to be released, but may allow atmospheric oxygen to enter into the anode compartment of the fuel cell. If oxygen does enter the anode chamber, it will diminish the power output of the cell, and adversely affect the performance of the DMFC system. However, this problem may be addressed by utilizing a gas selective material such as Teflon AF tubing, available from Biogeneral Inc. which preferentially allows carbon dioxide, but significantly less so for oxygen, to pass through it, thus limiting the amount of oxygen being introduced to the system while still allowing carbon dioxide to be removed from the system. It may further be possible to cause the carbon dioxide to travel to the ambient environment via a tortuous path once it has been eliminated from the fuel cell, thus creating a "blanket" of carbon dioxide that will substantially prevent oxygen from passing into the anode chamber. The formation of a "blanket" of carbon dioxide is further assisted by the fact that a higher $CO_2$ pressure inside the anode chamber than the atmospheric pressure drives the $CO_2$ flux leaving the anode chamber. Other methods, including the use of passive valves and other mechanical apparatus may be used to limit the flow of oxygen into the anode chamber. In any event any associated losses due to the limited introduction of oxygen are very likely to be less than those caused by the parasitic power drain of flow control apparatuses.

In accordance with another aspect of the invention, the water generated in the cathodic reaction is evaporated into the atmosphere, or otherwise removed. Thus, there is no need for additional components for recirculating water. In this manner, a passive system is provided in which fuel is added as it is consumed by a volume replacement method. This provides a simple system that would exhibit increased net power provided to the load due to lower parasitic losses. Referring to FIG. 6, another aspect of the invention is schematically illustrated in which a second fuel inlet 60 can be included at a different port in the membrane electrode assembly, to allow a second fuel concentration to be introduced into the system. For example, having two fuel inlets into the anode chamber 18 would allow a high methanol concentration (or pure methanol) fuel to be delivered by the first inlet 50, for example, and a low methanol concentration (or water) fuel to be delivered by the second port 60. Each inlet could independently deliver methanol or water (aqueous solutions of varying concentrations) in such a manner that fuel concentration could be controlled by switching between the high and low concentration fuels. A feed-back mechanism for the valves may be cell temperature, methanol concentration, cell voltage, cell current and cell power output or other means desired in a particular application. In FIG. 6, the fuel inlets are shown located on opposite aspects of the fuel cell system, however they may be placed in close proximity to one another as well.

The designs illustrated in FIGS. 5 and 6 enable a fully functional DMFC to be fabricated with few, if any pumps. This is particularly important with respect to hand held devices, as noted herein, because in such a device, even a small pump can lead to a significant parasitic power loss associated with operation of each pump. It also enables a functional DMFC to be built that does not require fuel recirculation, cathode water collection, or internal circulation of reactants and byproducts, each of which is a comparatively complicated and inefficient operation. This design enables a very compact DMFC system to be constructed which in turn produces high system volumetric power density and minimal parasitic power losses and enables a DMFC with fewer active control mechanisms, thus reducing the complexity and expense of the DMFC system.

Figure 6A:
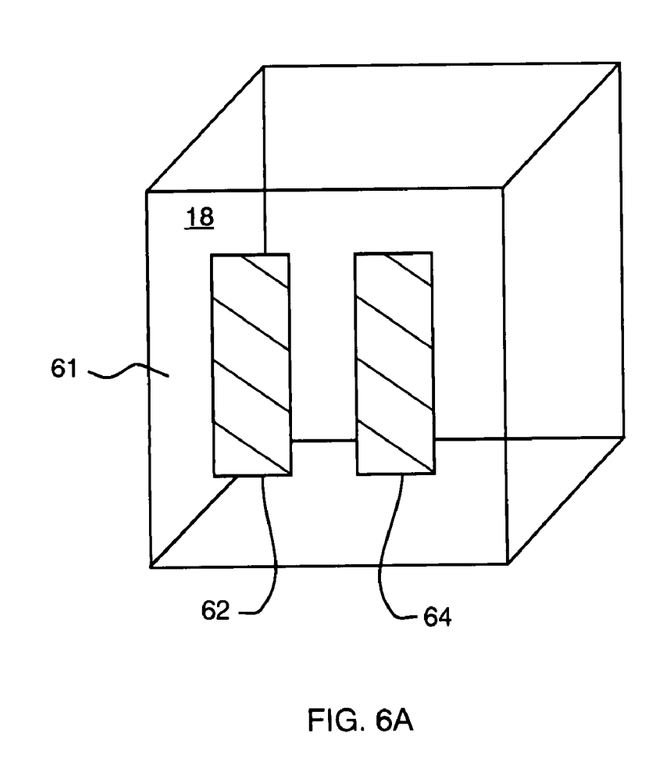
FIG. 6A is an isometric illustration of an anode chamber having a gas permeable wall portion, in accordance with one aspect of the invention.
Figure 6B:
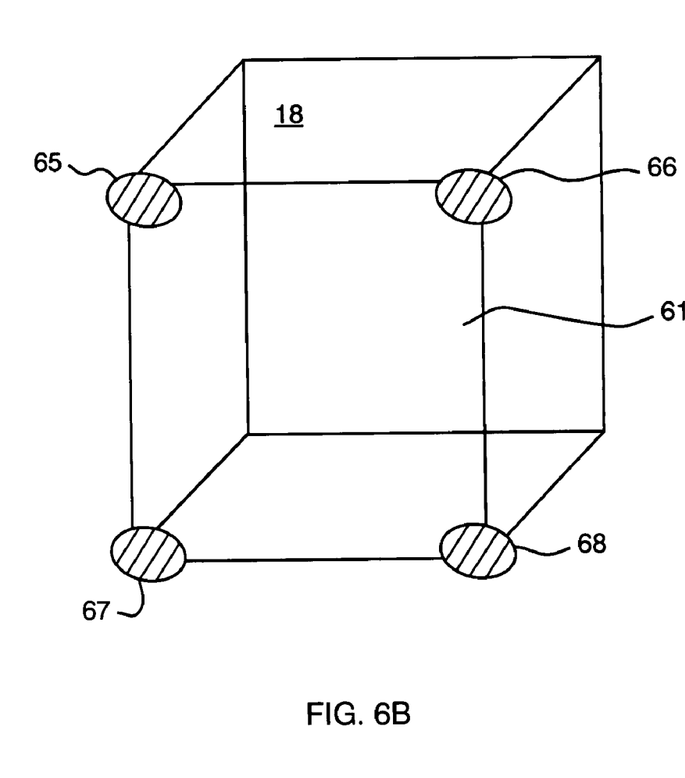
FIG. 6B is the device of FIG. 6A with gas permeable material comprising a different aspect of the anode chamber.

In another embodiment of the invention, a typical diffusion layer is used to fabricate the DMFC, but the anode chamber is fabricated with at least one surface using a gas permeable material. Two examples of this aspect of the invention are set forth in FIGS. 6A and 6B. In FIGS. 6A–6B the gas permeable layer areas are illustrated as windows 62 and 64 in FIG. 6a, and as portholes 65 through 68 in FIG. 6B. These gas permeable portions allow gaseous carbon dioxide to be removed from the fuel cell. If this embodiment of the invention is implemented, then more typical MEA assemblies may be utilized in the fabrication of the DMFC and DMFC system.

In addition, it is possible to apply a catalyst to the gas permeable material, to ensure that any methanol vapor that passes through the gas permeable material will be oxidized upon exposure to oxygen present in the ambient environment.

It should be noted that for purposes of clarity of illustration, FIGS. 6A and 6B show the gas permeable membrane sections on one side 61 of the anode chamber. It should be understood that gas permeable surfaces, windows or other shapes, can be configured on any aspect of the anode chamber, or on multiple aspects (or sides) of the chamber, while remaining within the scope of the present invention.

Figure 7A:
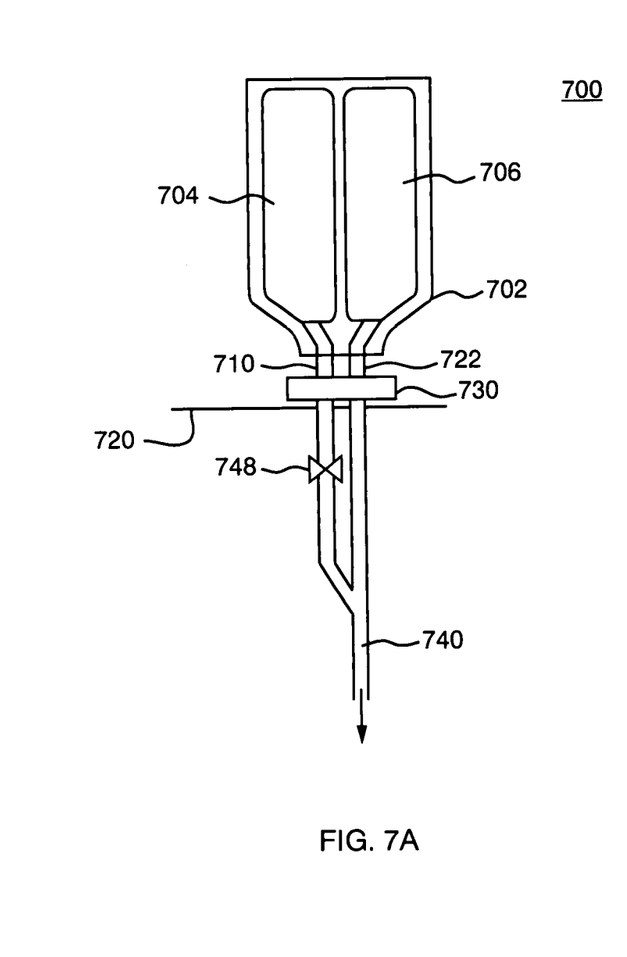
FIG. 7A is a schematic cross section of one embodiment of a direct methanol fuel delivery assembly in accordance with the present invention which contains separate bladders for fuel and water.

Referring now to FIGS. 7A through 10, another aspect of the invention will be described. FIG. 7 illustrates a fuel container and delivery assembly 700, which may be used in the system of FIG. 1 (in which the component is labeled as fuel container and delivery assembly 4). The fuel container and delivery assembly 700 has an exterior housing 702. The exterior housing 702 may be a substantially rigid cartridge. The cartridge 702 may be inserted into an external fuel delivery apparatus, or an internal reservoir within the system. The cartridge 702 encloses two collapsible containers, the first container 704, being a container for a fuel solution. This may be MeOH in the form of pure methanol or a concentrated aqueous methanol solution ("methanol"). A second collapsible fuel container 706 preferably holds water or a dilute aqueous methanol solution ("water"). The fuel container 704 has a conduit 710, which leads out of the housing 702 toward the fuel cell system, which system is illustrated schematically by line 720. The second container, which is the water container 706, has a conduit 722 that leads towards the system 720.

An interface 730 is a leakproof seal that is suitably located between the fuel container and delivery assembly and the fuel cell system. It may be a mechanical coupling or an elastomeric seal that is impermeable to both liquids and gasses, so that methanol solution and water will feed into the fuel cell system without leakage or waste. In accordance with an alternative aspect of the invention, the fuel container and delivery assembly 700 has an outer housing 702 (which houses the fuel container 704 and the water container 706) and in this case the interface 730 is located within the direct methanol fuel cell system (FIG. 7B).

As will be understood by those skilled in the art, it is desirable to mix the methanol or methanol solution with water in order to adjust the concentration of fuel delivered to the fuel cell. In some instances, a high concentration of fuel (or a pure methanol) may be needed to start up a system, or satisfy high power demands. A lower concentration fuel might be needed to continuously power a system or to provide power for critical, low power functions such as maintaining non-volatile data in a personal digital assistant, while a system is powered down, similar to the functionality provided by a battery-backed NVRAM.

Figure 7B:
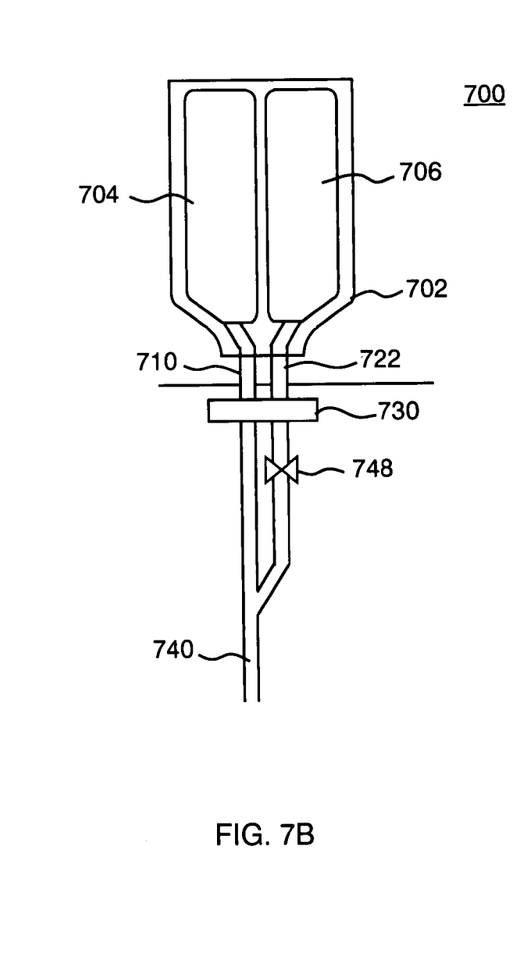
FIG. 7B is an alternative embodiment of the device of FIG. 7A.

In the embodiments of FIGS. 7A and 7B, methanol and water are introduced into the system via separate conduits 710 and 722. Mixing is performed in one of a number of ways, such as that shown in FIG. 7A in which the methanol conduit 710 is routed into the water conduit 722 to mix the two substances in a single conduit 740. As an alternative, as illustrated in FIG. 7B, the water conduit 722 is routed into the methanol conduit 710. The flow of the components of the fuel can be controlled by metering valves, such as the valve 748. The combined conduit 740 then leads to the flow field plate and diffusion layer (or gas permeable layer) as previously described herein in the anode portion 18 of the fuel cell (FIG. 5).

Figure 8:
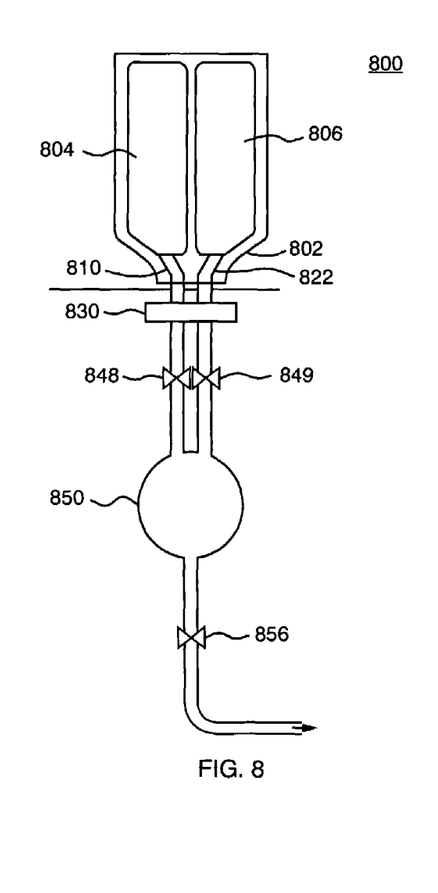
FIG. 8 is another embodiment of the fuel container and delivery apparatus of the present invention in which the fuel solution and water are in separate fuel bladders and have conduits, which lead into a mixing chamber for mixing the fuel and water.

Another aspect of the invention is illustrated in FIG. 8. FIG. 8 shows a fuel delivery assembly 800, which has an outer housing 802 enclosing a methanol or methanol in solution container 804 and a water container 806. A conduit 810 leads from the methanol solution container 804. A conduit 822 leads from the water container 806. An interface 830 provides a leakproof link for the two conduits into the fuel cell system 820.

The conduits 810 and 822 are valved (848, 849) and appropriate amounts, as adjusted for the desired methanol concentration, are introduced into a mixing chamber 850. Once mixed, the aqueous fuel solution is valved at valve 856 to the fuel flow plate and diffusion layers of the anode portion of a membrane electrode assembly of a fuel cell, such as that illustrated in FIG. 5.

As will be understood by those skilled in the art, a pump may be used to implement the invention to ensure that a fuel mixture is available when needed. However because pumps can add to the complexity, weight and bulk of a fuel cell system, increasing parasitic losses, a pressurized cartridge that includes a pressure-applying element, as described in a commonly-owned, presently co-pending U.S. patent application Ser. No.: 10/041,301 filed on Jan. 8, 2002 for a FUEL CONTAINER AND DELIVERY APPARATUS FOR A LIQUID FEED FUEL CELL SYSTEM is preferable. It is also noted that, the fuel container and delivery system need not be cartridge based, or even refillable. The fuel container may be contained within the system or apparatus to which it supplies power. Alternatively, it can be controlled as a disposable unit while remaining within the scope of the present invention.

Figure 9:
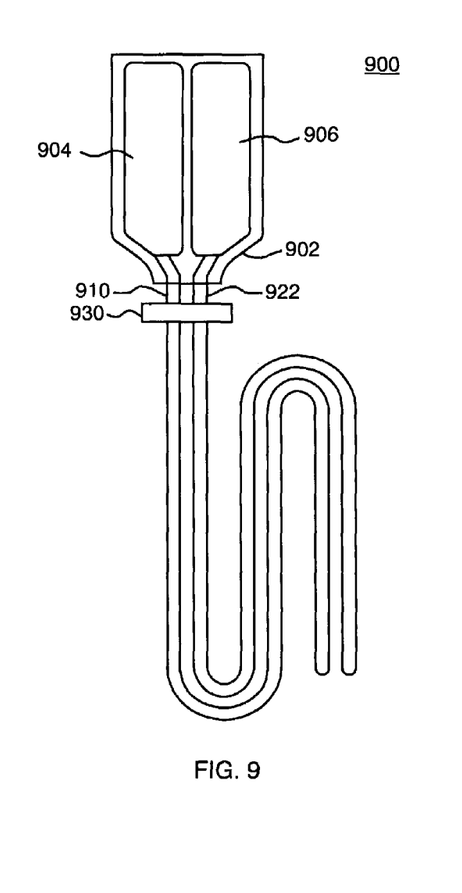
FIG. 9 is an alternative embodiment of the fuel container and delivery apparatus in which the separate conduits for fuel and water lead directly to the diffusion layers of the fuel cell.
Figure 10:
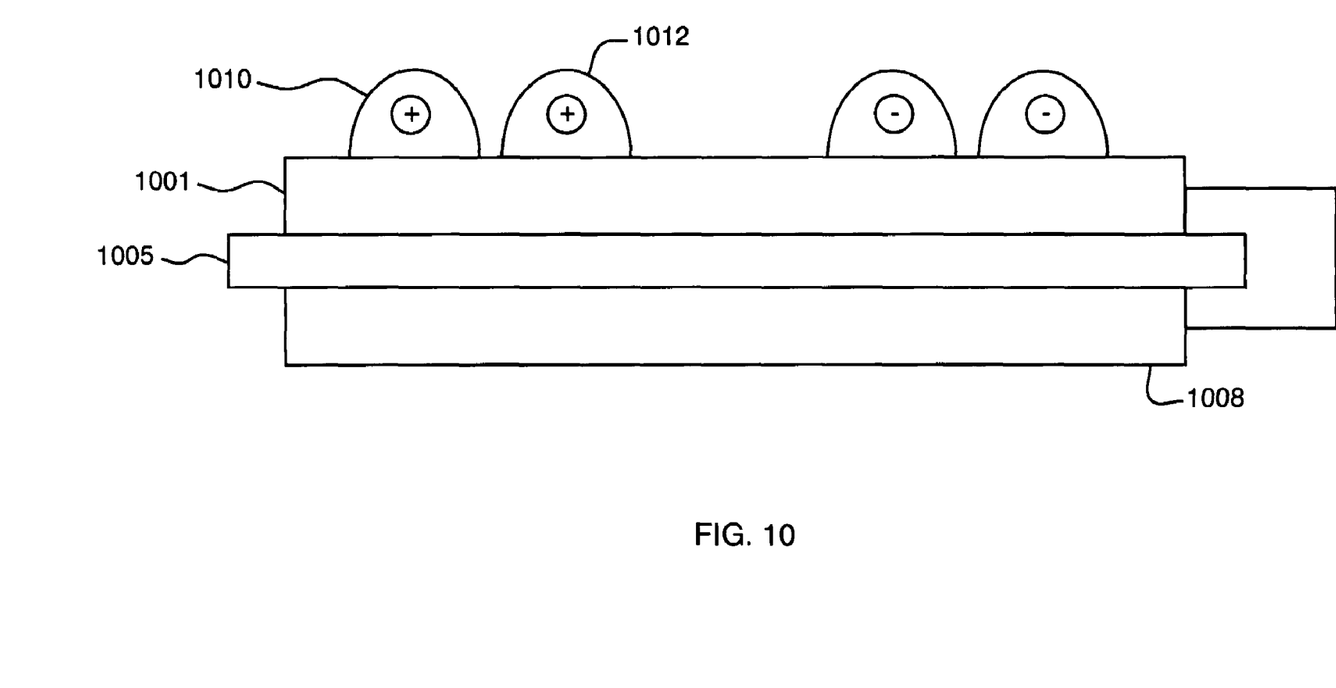
FIG. 10 is a side section of the device of FIG. 9 with the conduits shown contiguous to the anode diffusion layer, in accordance with the present invention.

Another aspect of this embodiment of the invention is illustrated in FIGS. 9 and 10. A fuel container and delivery assembly 900 (FIG. 9) has an exterior housing 902 which encloses a methanol solution container 904 and a water container 906. The methanol solution flows through the methanol conduit 910, and the water flows through water conduit 922. An interface 930, similar to interface 730, may also be provided. These conduits are shown in cross section in FIG. 10. The conduits include apertures along the walls thereof through which fluids can pass. The methanol passes through the walls of the conduit 1010 and into the anode diffusion layer 1001. In a similar fashion, water is dispersed to the fuel cell anode diffusion layer 1001 via openings in the flow channel 1012. The different liquids mix in the diffusion layer 1001 prior to being introduced to the protonically conductive membrane 1005 (which is also in intimate contact with cathode diffusion layer 1008). Valves can be used to control the amounts of fuel and/or water that are dispersed into the respective diffusion layer.

It should be understood that, in the embodiment illustrated in FIGS. 7A through 10, the different components of the methanol and water fuel mixture held in fuel container 702 and water container 706, for example, are packaged as flexible bladders under pressure. As an alternative, the containers may be rigid walled chambers, in which case the fuel is drawn via suction or gravity. It is again noted that those skilled in the art will recognize that methanol may be either neat methanol or a concentrated solution of methanol and water.

It is preferable that these embodiments of the invention be employed with fuel cell systems that do not recirculate water or fuel, and which also employ a gas permeable is layer for the removal of carbon dioxide.

It should be understood by those skilled in the art that the invention described herein provides an improved direct oxidation fuel cell which is simplified and exhibits fewer power losses, as it does not require the use of pumps and other recirculation components. It also allows adjustments to the fuel concentration, which enables fuel to be added only, as it is consumed. Thus, problems associated with methanol crossover and water carryover are reduced due to limiting the introduction of those fluids into the system.

The foregoing description has been directed to specific embodiments of the invention. It will be apparent, however, that other variations and other modifications may be made to the described embodiments, with the attainment of some or all of the advantages of such. Therefore, it is the object of the appended claims to cover all such variations and modifications as come within the true spirit and scope of the invention.

What is claimed is:

1. A direct oxidation fuel cell, comprising
   (A) a catalyzed membrane electrolyte, having an anode aspect and a cathode aspect;
   (B) a fuel cell housing enclosing said fuel cell with an anode chamber being defined between said anode aspect of the catalyzed membrane electrolyte and an exterior portion of said cell housing, said fuel cell housing also including a cathode chamber being defined between said catalyzed membrane electrolyte and an exterior portion of said fuel cell housing, opposite said anode chamber;
   (C) a direct fuel feed into said anode chamber that has no liquid exit port such that liquid that is present in said anode chamber cannot exit said anode chamber except across said catalyzed membrane electrolyte;
   (D) at least one gaseous effluent release port in said anode chamber, which is in substantially direct gaseous communication with the ambient environment, to vent gaseous product of an electricity-generating reaction from said anode chamber to the ambient environment, and not into said cathode chamber, as said gaseous product is generated; and
   (E) a load coupled across said fuel cell, providing a path for electrons produced in electricity generating reactions of said fuel cell.

2. The direct oxidation fuel cell as defined in claim 1 wherein a substance delivered by said direct fuel feed into a liquid-closed volume in the anode chamber is up to 100% fuel.

3. The direct oxidation fuel cell as defined in claim 2 wherein said fuel is methanol.

4. The direct oxidation fuel cell as defined in claim 1 wherein fuel is delivered by said direct fuel feed into said anode chamber without anode liquid recirculation.

5. The direct oxidation fuel cell as defined in claim 1 wherein water produced at said cathode is not actively collected or pumped to said anode chamber.

6. The direct oxidation fuel cell as defined in claim 1 wherein gaseous product traveling out of said fuel cell through said gaseous effluent release port is at least partially comprised of carbon dioxide.

7. The direct oxidation fuel cell as defined in claim 1 wherein at least a portion of one wall of said anode chamber is gas permeable and liquid impermeable.

8. A direct oxidation fuel cell, comprising:
   (A) a catalyzed membrane electrolyte having an anode aspect and a cathode aspect;
   (B) a fuel cell housing with an anode chamber being defined between said anode aspect of said catalyzed membrane electrolyte and an exterior portion of said cell housing, and fuel being delivered to, but not actively recirculated from, said anode chamber, said fuel cell housing also including a cathode chamber being defined between said catalyzed membrane electrolyte and an exterior portion of said fuel cell housing, opposite said anode chamber; and
   (C) a gaseous anodic product removal component disposed between said catalyzed membrane electrolyte and at least a portion of the interior wall of the anode chamber for effective release by venting anodically generated gaseous product of an electricity-generating reaction substantially directly to the ambient environment, and not into the cathode chamber.

9. A direct oxidation fuel cell system, comprising:
(A) a direct oxidation fuel cell having:
   (i) a catalyzed membrane electrolyte, having an anode aspect and a cathode aspect;
   (ii) a fuel cell housing enclosing said fuel cell with an anode chamber being defined between said anode aspect of the catalyzed membrane electrolyte and an exterior portion of said cell housing, said fuel cell housing also including a cathode chamber being defined between said catalyzed membrane electrolyte and an exterior portion of said fuel cell housing, opposite said anode chamber;
   (iii) a direct fuel feed into an anode chamber, having no liquid exit, such that fuel that enters into the anode chamber by the direct fuel feed cannot exit the anode chamber except across said catalyzed membrane electrolyte; and
   (iv) at least one gaseous effluent release port located in said anode chamber in close proximity to said anode aspect of the catalyzed membrane electrolyte, which is in substantially direct gaseous communication with the ambient environment and through which anodically generated gaseous product of an electricity reaction is vented and released from said anode chamber as it is generated, and not into the cathode chamber;
(B) a fuel source coupled to said anode chamber; and
(C) means by which current can be collected from the fuel cell and conducted to a load, whereby electricity is generated by said fuel cell as fuel is delivered to said anode chamber without external pumping of cathodically-generated water and without active water removal elements.

10. A direct oxidation fuel cell, comprising:
(A) a catalyzed membrane electrolyte assembly having an anode aspect and a cathode aspect and
(B) means for outporting gaseous product of an electricity generating reaction away from the anode aspect of the fuel cell substantially directly to the ambient environment through an anode chamber and not into a cathode chamber which means for outporting gasses is disposed in close proximity to said anode aspect of the catalyzed membrane electrolyte assembly.

11. A direct oxidation fuel cell comprising:
(A) a membrane electrode assembly, including:
   (i) a protonically-conductive, electronically non-conductive catalyzed membrane electrolyte;
   (ii) a catalyst disposed on said membrane electrolyte;
   (iii) an anode diffusion layer disposed contiguous to an anode aspect of the membrane electrolyte;
   (iv) a cathode diffusion layer disposed contiguous to a cathode aspect of the membrane electrolyte; and
(B) a gas-permeable, liquid-impermeable layer for releasing anodically generated gaseous product of an electricity-generating reaction as it is generated and is vented to the ambient environment and not into said cathode chamber, coupled in proximity to said anode diffusion layer; and
(C) a coupling across said fuel cell to conduct electricity generated by said fuel cell to an associated load; and
(D) a fuel cell housing substantially enclosing said fuel cell.

12. A direct oxidation fuel cell system, comprising:
(A) a fuel source;
(B) a direct oxidation fuel cell including:
   (i) a protonically-conductive, electronically non-conductive catalyzed membrane electrolyte;
   (ii) a catalyst disposed on said membrane electrolyte;
   (iii) an anode diffusion layer disposed contiguous to the anode aspect of the membrane electrolyte;
   (iv) a cathode diffusion layer disposed contiguous to the cathode aspect of the membrane electrolyte; and
   (v) a gas-permeable, liquid-impermeable layer coupled in proximity to said anode diffusion layer, for releasing anodically generated gaseous product of an electricity-generating reaction to an ambient environment and not into said cathode chamber; and
   (vi) a coupling across said fuel cell to conduct electricity generated by said fuel cell to an associated load.

13. The direct oxidation fuel cell system as defined in claim 12 wherein the fuel is up to 100% fuel.

14. The direct oxidation fuel cell system as defined in claim 13 wherein said fuel is methanol.

15. A direct oxidation fuel cell system, comprising:
(A) a fuel source;
(B) a direct oxidation fuel cell having a catalyzed membrane electrolyte with an anode aspect and a cathode aspect;
(C) a cell housing with an anode chamber defined between the anode aspect of the catalyzed membrane and one exterior portion of said cell housing, with said chamber having no exit port for liquid; and
(D) an element disposed between said fuel source and said anode aspect of the direct oxidation fuel cell for controlling the delivery of fuel to the anode aspect of the membrane electrolyte.

16. The direct oxidation fuel cell system as defined in claim 15, wherein said element controls the delivery of fuel without pumps or active recirculation mechanisms.

17. The direct oxidation fuel cell system as defined in claim 15 wherein
said fuel source is disposed external to the fuel cell.

18. The direct oxidation fuel cell system as defined in claim 15 wherein
a pressure differential exists between the fuel in the fuel source and the anode chamber of the fuel cell.

19. The direct oxidation fuel cell system as defined in claim 15 wherein
said fuel source contains more than one liquid that may be mixed between the fuel source and the anode of the fuel cell.

20. The direct oxidation fuel cell system as defined in claim 19 wherein
said fuel source contains methanol and water.

21. The direct oxidation fuel cell system as defined in claim 15 wherein
said fuel source is capable of delivering up to 100% fuel to said fuel cell.

22. The direct oxidation fuel cell system as defined in claim 21 wherein said fuel is methanol.

23. The direct oxidation fuel cell system as defined in claim 15 wherein
delivery of said fuel is performed by suction.

24. The direct oxidation fuel cell system as defined in claim 15 wherein
said delivery by suction is performed by the action of a capillary network in a porous component, which is disposed between said fuel source and said anode of said direct oxidation fuel cell.

25. A direct oxidation fuel cell, comprising:
(A) a catalyzed membrane electrolyte, having an anode aspect and a cathode aspect wherein said anode aspect has no liquid exit, and anodically generated gaseous product of an electricity-generating reaction is vented to the ambient environment as it is generated through an element coupled in close proximity to said anode aspect, and said anodically generated gaseous product is not vented across said membrane electrolyte into a cathode chamber;
(B) a fuel source for providing fuel to said anode aspect, wherein said fuel comprises concentrated methanol; and
(C) a load coupled across said fuel cell, providing a path for electrons produced in electricity-generating reactions of said fuel cell.

26. A direct oxidation fuel cell, comprising:
(A) a catalyzed membrane electrolyte, having an anode aspect and a cathode aspect, and wherein said anode aspect has no liquid exit, and anodically generated gaseous product of an electricity-generating reaction is vented to the ambient environment as it is generated through an element coupled in close proximity to said anode aspect, and said anodically generated gaseous product is not vented across said membrane electrolyte into a cathode chamber;
(B) a fuel source for providing fuel to said anode aspect, wherein said fuel consists essentially of concentrated methanol; and
(C) a load coupled across said fuel cell, providing a path for electrons produced in electricity-generating reactions of said fuel cell.

27. A direct oxidation fuel cell system, comprising:
(A) a direct oxidation fuel cell having:
  (i) a catalyzed membrane electrolyte, having an anode aspect and a cathode aspect, and wherein said anode aspect has no liquid exit, and anodically generated gaseous product of an electricity-generating reaction is vented to the ambient environment as it is generated through an element coupled in close proximity to said anode aspect, and said anodically generated gaseous product is not vented across said membrane electrolyte into a cathode chamber;
  (ii) a source of fuel, said fuel comprising concentrated methanol for providing fuel to said anode aspect;
(B) a fuel cell housing enclosing said fuel cell; and
(C) a load coupled across said fuel cell by which current can be collected from the fuel cell.

28. A direct oxidation fuel cell system, comprising:
(A) a direct oxidation fuel cell having:
  (i) a catalyzed membrane electrolyte, having an anode aspect and a cathode aspect, and wherein said anode aspect has no liquid exit, and anodically-generated gaseous product of an electricity-generating reaction is vented to the ambient environment as it is generated through an element coupled in close proximity to said anode aspect, and said anodically generated gaseous product is not vented across said membrane electrolyte into a cathode chamber;
  (ii) a source of fuel, said fuel consisting essentially of concentrated methanol for providing fuel to said anode aspect;
(B) a fuel cell housing enclosing said fuel cell; and
(C) a load coupled across said fuel cell by which current can be collected from the fuel cell.

29. A direct oxidation fuel cell, comprising:
(A) a catalyzed membrane electrolyte, having an anode aspect and a cathode aspect, and wherein said anode aspect has no liquid exit, and anodically-generated gaseous product of an electricity-generating reaction is vented to the ambient environment as it is generated through an element coupled in close proximity to said anode aspect, and said anodically generated gaseous product is not vented across said membrane electrolyte into a cathode chamber;
(B) a source of fuel having a methanol concentration greater than the 1:1 ratio of methanol:water required by the electrochemical reaction at the anode aspect for providing fuel to said anode aspect; and
(C) a load coupled across said fuel cell, providing a path for electrons produced in electricity-generating reactions of said fuel cell.

30. A direct oxidation fuel cell system, comprising:
(A) a direct oxidation fuel cell having:
  (i) a catalyzed membrane electrolyte, having an anode aspect and a cathode aspect, and wherein said anode aspect has no liquid exit, and anodically-generated gaseous product of an electricity-generating reaction is vented to the ambient environment as it is generated through an element coupled in close proximity to said anode aspect, and said anodically generated gaseous product is not vented across said membrane electrolyte into a cathode chamber; and
  (ii) a source of fuel having a methanol concentration greater than the 1:1 ratio of methanol:water required by the electrochemical reaction at said anode aspect for providing fuel to said anode aspect;
(B) a fuel cell housing enclosing said fuel cell; and
(C) a load coupled across said fuel cell by which current can be collected from the fuel cell.

* * * * *